(12) United States Patent
Guerin et al.

(10) Patent No.: US 7,454,803 B2
(45) Date of Patent: Nov. 25, 2008

(54) MIST DELIVERY SYSTEM

(75) Inventors: Jeanne Guerin, Mukiteo, WA (US);
Douglas E Emsley, Bothell, WA (US);
Donald R Furlong, Woodinville, WA
(US); Dennis C Lin, Everett, WA (US);
Bethany L. Franko, Seattle, WA (US);
Kevin S Zielki, Seattle, WA (US);
Cynthia Vandewall, Snohomish, WA
(US); Peter R Mitchell, Marysville, WA
(US); William Sanford, Mukiteo, WA
(US); Vicki Curtis, Stanwood, WA (US);
Wing Cheung, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/944,880

(22) Filed: Nov. 26, 2007

(65) Prior Publication Data

US 2008/0072376 A1 Mar. 27, 2008

Related U.S. Application Data

(63) Continuation of application No. 10/711,553, filed on Sep. 24, 2004, now abandoned.

(51) Int. Cl.
*A47K 3/022* (2006.01)

(52) U.S. Cl. .................... 4/597; 4/524; 4/525; 4/614; 4/596

(58) Field of Classification Search .............. 4/597, 4/524, 525, 612–614, 598, 569, 596, 601, 4/615; 52/264; 607/87; 34/202, 224, 225, 34/232, 233
See application file for complete search history.

(56) References Cited

U.S. PATENT DOCUMENTS

| 2,650,368 | A | 9/1953 | Evans |
| 3,007,178 | A | 11/1961 | Altman et al. |
| 3,128,161 | A | 4/1964 | Hudon et al. |
| 3,396,411 | A | 8/1968 | Vieceli |
| 3,587,118 | A | 6/1971 | Compton |
| 3,958,756 | A | 5/1976 | Trenary et al. |

(Continued)

FOREIGN PATENT DOCUMENTS

DE 29820581 11/1999

(Continued)

OTHER PUBLICATIONS

Jim Hightower, "Hightower: Showers on Planes," AlterNet.org, Aug. 22, 2000.

(Continued)

*Primary Examiner*—Khoa D Huynh
(74) *Attorney, Agent, or Firm*—Ostrager Chong Flaherty & Broitman P.C.

(57) ABSTRACT

A mist delivery system includes an enclosure having at least one misting nozzle coupled thereto. The enclosure includes a primary wall and a secondary wall, whereby an air channel is defined between the primary wall and the secondary wall. A controller directs misted air through the misting nozzle and further activates an air flow system such that misted air within the shower area flows through and is dried in the air channel.

16 Claims, 3 Drawing Sheets

U.S. PATENT DOCUMENTS

| | | | |
|---|---|---|---|
| 4,130,120 A | 12/1978 | Kohler, Jr. |
| 4,340,981 A | 7/1982 | Vanags |
| 4,348,777 A | 9/1982 | Peterson |
| 4,424,598 A | 1/1984 | Cima |
| 4,425,672 A | 1/1984 | Johnson et al. |
| 4,477,934 A | 10/1984 | Salminen |
| 4,589,463 A | 5/1986 | Ryan |
| 4,645,145 A | 2/1987 | Alie |
| 4,724,553 A | 2/1988 | Bianchi |
| 4,884,767 A | 12/1989 | Shibata |
| 5,099,587 A | 3/1992 | Jarosch |
| 5,111,626 A | 5/1992 | Fortune |
| 5,150,863 A | 9/1992 | Hozumi |
| 5,216,763 A | 6/1993 | Grenier |
| 5,243,716 A | 9/1993 | Zaccai et al. |
| 5,293,653 A | 3/1994 | Filipponi |
| 5,426,900 A | 6/1995 | Springer |
| 5,459,890 A | 10/1995 | Jarocki |
| 5,474,260 A | 12/1995 | Schwertfeger et al. |
| 5,664,593 A * | 9/1997 | McClain ........................ 4/525 |
| 5,692,954 A * | 12/1997 | Lee et al. .................... 454/187 |
| 5,718,008 A | 2/1998 | Pane |
| 5,938,126 A | 8/1999 | Rehman et al. |
| 6,007,025 A | 12/1999 | Coughren et al. |
| 6,047,416 A | 4/2000 | Carrier |
| 6,079,669 A | 6/2000 | Hanay et al. |
| 6,101,766 A | 8/2000 | Mogensen |
| 6,182,926 B1 | 2/2001 | Moore |
| 6,243,993 B1 | 6/2001 | Swensson |
| 6,256,936 B1 | 7/2001 | Swensson et al. |
| 6,257,523 B1 | 7/2001 | Olliges |
| 6,443,164 B1 | 9/2002 | Parker et al. |
| 6,470,512 B1 | 10/2002 | Lau et al. |
| 6,554,208 B1 | 4/2003 | Venuto |
| 6,604,709 B1 | 8/2003 | Wentland et al. |
| 6,962,005 B1 | 11/2005 | Khosropour et al. |
| 7,013,504 B2 | 3/2006 | Brunelle et al. |
| 7,168,108 B2 * | 1/2007 | Guerin et al. .................. 4/596 |
| 2003/0188378 A1 | 10/2003 | Brunelle et al. |
| 2004/0116880 A1 | 6/2004 | Venuto |
| 2005/0086735 A1 | 4/2005 | Lim |
| 2005/0210576 A1 | 9/2005 | Guerin et al. |

FOREIGN PATENT DOCUMENTS

| | | |
|---|---|---|
| EP | 0872204 | 10/1998 |
| EP | 1064875 | 1/2001 |
| EP | 1075829 | 2/2001 |
| EP | 1314374 | 5/2003 |
| GB | 2222944 | 3/1990 |
| GB | 2243546 | 11/1991 |
| GB | 2266662 | 11/1993 |
| JP | 11350759 | 12/1999 |

OTHER PUBLICATIONS

U.S. Department of Transportation, "Lavatory Accessibility in Single-Aisle Aircraft—Final Report of the Aircraft Accessibility Federal Advisory Committee".

* cited by examiner

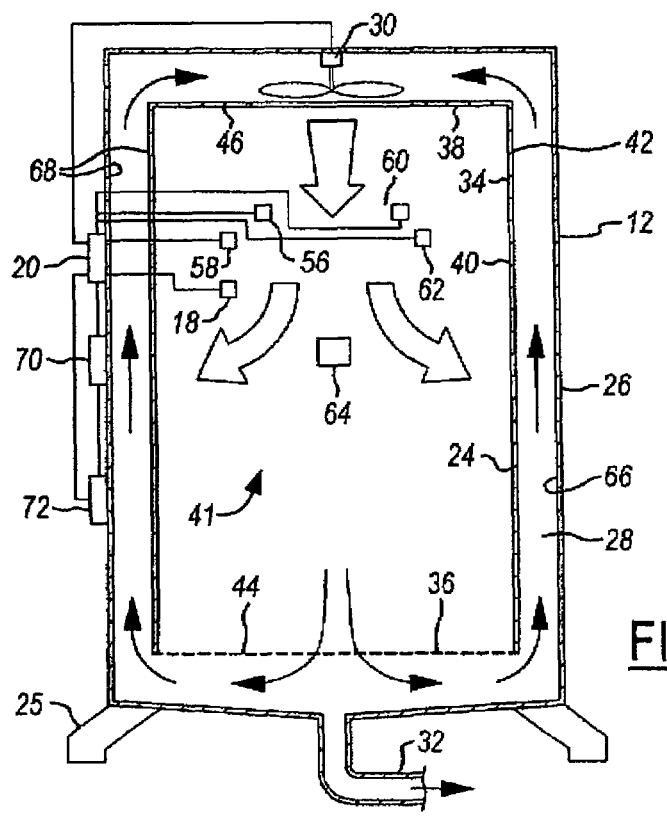
FIG. 3
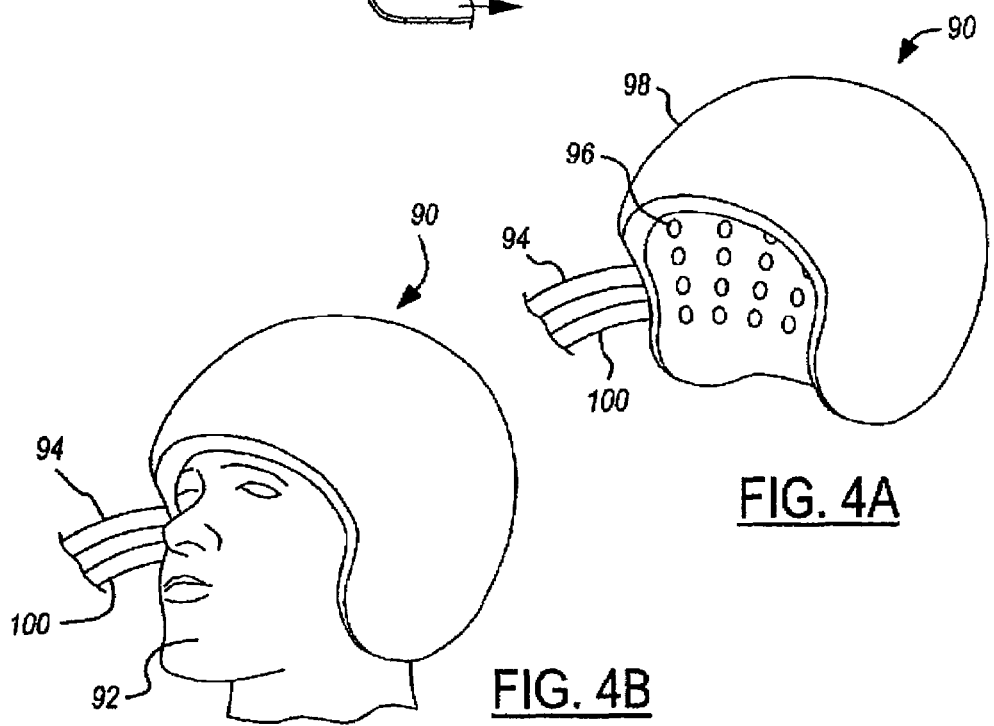
FIG. 4A
FIG. 4B

MIST DELIVERY SYSTEM

CROSS-REFERENCE TO RELATED APPLICATION

This application is in continuation of application Ser. No. 10/711,553 that was filed on Sep. 24, 2004 now abandoned.

The present invention is related to application (application Ser. No. 10/708,749) entitled "Shower System," filed on Mar. 23, 2004 and incorporated by reference herein.

TECHNICAL FIELD

The present invention relates generally to shower systems and drying systems, and more particularly to a showering system for optimizing space and water usage and a drying system therefor.

BACKGROUND OF THE INVENTION

Current shower and shower related systems are generally costly, and many use excessive amounts of water. These systems also require significant water supply storage, which adds to the overall weight of vehicles including those systems and limits operation of remote shower systems. These drawbacks make portable and remote shower systems impractical and generally unavailable for commercial use.

In addition to the excessive burden on the vehicles due to excess water weight, it has heretofore been difficult to absorb costs associated with substituting a shower system for an otherwise useful space. Systems limited by this burden include such vehicles as airplanes, spacecrafts, RVs, boats, maritime vessels, trucks, trains, buses, and mobile medical units.

Many current shower systems also limit outer space applications that require operation in zero or reduced gravity. These applications include space stations and interplanetary reduced gravity stations.

As discussed above, many current shower systems are unavailable for various uses requiring maximizing limited supplies of water, such as medical facilities, country houses, cabins, rest areas, camping facilities, beaches, and military installations.

Still further, current showering systems are not applicable to various other liquid distribution operations, such as cooling stations, agricultural field irrigation, animal cleaners, barn or stable cleaners, pesticide application, medical equipment sterilization, humidifiers, hair washers, skin moisturizers, nasal decongestion units, suntan sprayers, and spa treatments.

In view of these burdens, offering showers or mist distribution systems has been difficult to implement in the aforementioned applications, even where demand has been high.

The disadvantages associated with current shower systems have made it apparent that a new technique for showering or distributing mist is needed. The new technique should minimize water and space requirements.

BRIEF DESCRIPTION OF THE DRAWINGS

For a complete understanding of the invention, there will now be described some embodiments thereof, given by way of example, reference being made to the accompanying drawings, in which:

FIG. 3 is schematic diagram of air flow within a mist delivery system in accordance with another embodiment of the present invention;

FIG. 4a is perspective view of a portable mist delivery system in accordance with another embodiment of the present invention;

FIG. 4b is the system of claim 4a in operation;

DETAILED DESCRIPTION

Figure 1:
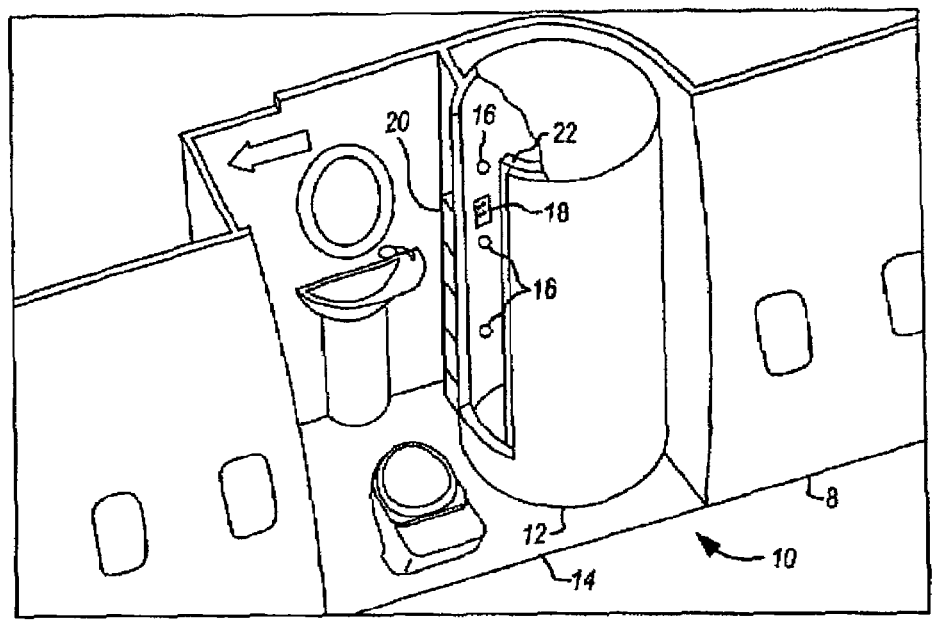
FIG. 1 is a perspective view of a vehicle with a section broken away illustrating a mist delivery system according to one embodiment of the present invention.

The present invention is illustrated with respect to a misting system and related drying system, particularly suited to the aerospace field. The present invention is, however, applicable to various other uses that may require misting systems, such as campers, spacecrafts, railroad cars, buses, maritime vehicles, and other such vehicles, as will be understood by one skilled in the art. In each of the following figures, the same reference numerals are used to refer to the same components.

Referring to FIG. 1, a vehicle 8 including the misting system 10 is illustrated. A perspective view of the vehicle 8 is shown having a piece of the vehicle skin removed such that the misting system 10 (mist delivery system) is visible. The misting system 10, in the present embodiment of the invention, is illustrated with an enclosure 12 and an adjacent changing area 14 or restroom. The misting system 10 is illustrated in accordance with one embodiment of the present invention. As was previously mentioned, the misting system 10 may be incorporated in various other vehicles, and the vehicle embodiment is merely used for illustration. Various other applications will be discussed in detail regarding FIGS. 4a, 4b, 5, and 6

The misting system 10 further includes a plurality of misting spouts or nozzles 16, a user controlled display 18, and a control device or controller 20 for the system 10. Also, between the enclosure 12 and the changing area 14, a door 22 is positioned such that a user may change in the changing area 14 and immediately enter the enclosure 12 without requiring a separate changing room other than the included changing area 14.

The nozzles or spouts 16 expel a heated or misted substance that may include at least one of water, an insect repellant, a hair growth formula, an ionized liquid, a tanning solution, a suntan solution, a soap, a shampoo, a disinfectant, a fuel, a fertilizer, or a spa treatment.

The system 10 may be powered by solar panels, nuclear power, energy from a battery, wind, tides, condensation, fuel cells, reactors, pressure created by weight and gravity, electrostatic power, human movements for energy, hand/foot pumps, $CO_2$ cartridges, pressurized water, ion magnets, propane, solar panels, chemical reactions, solid fuel, wind, reactors, gas, and any other power source known in the art.

Figure 2:
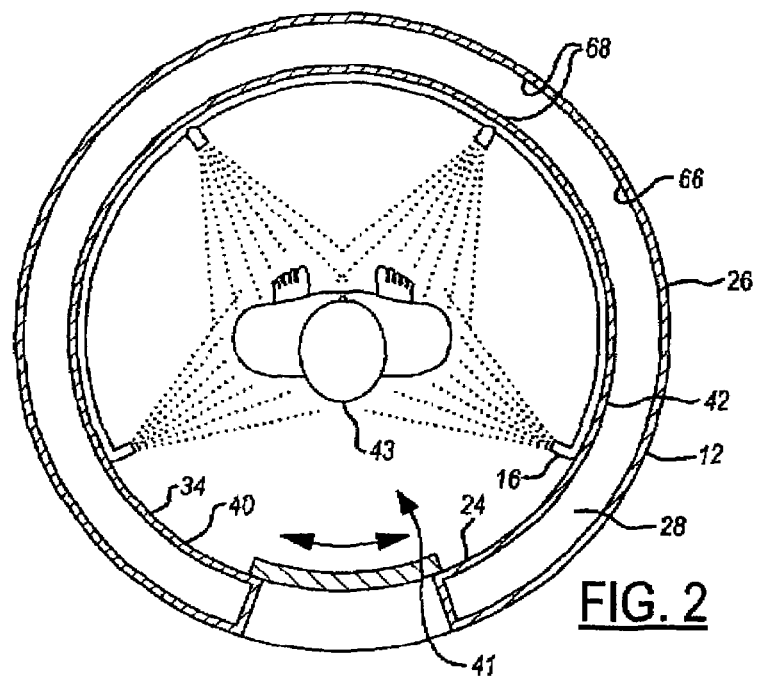
FIG. 2 is a partial top view of the mist delivery system of FIG. 1.

Referring to FIGS. 2 and 3, the misting system 10 is illustrated in accordance with another embodiment of the present invention. The enclosure 12 of the misting system 10 includes a shower stall or primary wall 24 and a shower stall housing or secondary wall 26 wherein an air channel 28 is defined therebetween. The misting system 10 is mounted on the vehicle 8 though a mount 25 coupled to the system 10.

The primary wall 24 of the misting system 10 includes at least one misting nozzle 16, though preferably a plurality of nozzles 16 are coupled thereto. The enclosure 12 also includes a fan 30 for circulating air through the air channel 28 and inside the primary wall 24. The enclosure 12 still further includes a water drain 32 allowing water to drain from within the primary wall 24 or the secondary wall 26. The misting system 10 may be controlled by a controller 20 operating in response to commands from a user input device such as display 18.

The primary wall 24 of the enclosure 12 substantially encloses the shower area 41. The illustrated primary wall 24 is cylindrical; however various other shapes of the internal primary wall 24 are also included in the present invention, such as cubicle, conical, spherical, irregular, or any other known three dimensional enclosure. The primary wall 24 includes a sidewall 34, a base 36, and a ceiling 38. The sidewall 34 includes an inner surface 40 facing the shower area 41 of the enclosure 12, and an outer surface 42 facing the secondary wall 26.

The primary wall ceiling 38 is coupled to the top of the sidewall 34, and the primary wall base 36 is coupled to the bottom of the sidewall 34. Both the base 36 and the ceiling 38 have openings defined respectively therein.

The base 36 is embodied as perforated whereby warm moist air from within the shower area 41 may escape or be drawn out of the shower area 41. Alternate embodiments of the present invention include a single hole or plurality of holes defined within the base 36 such that the warm moist air may be removed from the shower area 41.

The ceiling 38, in accordance with one embodiment, includes at least one opening 39 defined therein such that air from the fan 30 may be blown into the shower area 41 both for the purposes of drying the passenger 43 and for blowing warm moist air out through the base 36. The fan 30 may also be positioned at any other section of the enclosure 12, and the ceiling 38 need not include an opening therefor. An alternate embodiment of the present invention includes a fan or blower sucking air out of the enclosure 12 such that water may be directed in a weightless environment.

The walls of the shower area 41 including the inner sidewall surface 40, an inner surface of the base 44, and an inner surface of the ceiling 46 are embodied as either coated with or made of a hydrophobic surface, such that little or no water from the mist sprayed from the misting nozzles 16 condenses on their surfaces. Alternate embodiments of the present invention include only portions of the shower surfaces coated or made of a hydrophobic surface such that water condenses on some or all of the shower area surfaces and is therefrom drained from the system 10.

The shower area 41 is entered through the door 22, which is embodied as a swinging door or a sliding door on the inside or outside of the enclosure 12. One embodiment of the system 10 activates in response to opening and closing of the door 22 such that the system 10 halts operations when the door 22 is opened. Important to note is that for portable embodiments or free standing embodiments, the misting system 10 may include an opening rather than a door, as will be discussed in detail later.

The sidewall 34 is embodied as cylindrical such that substantially optimal misting may be arranged. Coupled to an inner surface 40 of the sidewall 34 is a plurality of misting nozzles 16.

Numerous arrangements of misting nozzles 16 are also included in the present invention, such as having any number of misting nozzles 16 arranged in rows or including diagonal arrangements of nozzles or individual nozzles fed by a series of water pipes.

The nozzle arrangement, in accordance with one embodiment of the present invention, includes a plurality of nozzles activated to receive water or another substance as a function of the user's height. For example, a taller user would either activate or require activation of all nozzles 16 whereas a shorter user may require only use of the lower nozzles. The nozzles 16 may be activated in response to a sensor arrangement evaluating a user's height, or in response to inputs from the user into the user display 18, which activates the controller 20.

The controller 20, in accordance with one embodiment of the present invention, receives signals from height sensors 56, such that the user's height may be determined, whereby the controller 20 activates nozzles 16 dependant on that height. Alternate embodiments of the present invention include the user inputting the user height into the display 18 such that the controller 20 receives the input signal and activates nozzles 16 as a function of that signal.

The controller 20 may control water pressure and temperature as a function of the distance of the nozzles 16 from the users for perfect water coverage and water temperature. Alternately, temperature sensors 58 and pressure sensors 60 are positioned around the inner surface 40 such that actual misting temperature and pressure at various points of the shower area 41 may be determined and adjusted through logic within the controller 20. For areas not sufficiently covered by the nozzles 16, a hand held nozzle for spraying the user may be included such that the user may spray the aforementioned areas.

In accordance with another embodiment of the present invention, distance sensors 62 generating signals as a function of a distance of the user from the nozzles 16 are included in the system 10. Signals generated therefrom are received in the controller 20, which adjusts temperature and pressure accordingly to provide maximum user comfort.

The controller 20 may also include logic such that the water pipe is drained between various user showers so that water temperature coming out of the nozzle 16 may be accurately controlled.

The controller 20 also may control mood lighting 64 and the LED display 18, such that as the various cycles of the shower operation are activated and completing various signals such as the changing of lighting texture or color, and/or signals on the LED display 18 are activated. Other signals may include informing the user how much time remains before the next cycle and what will occur during the next cycle.

One embodiment of the controller 20 controls cycles height adjustment, automatic system activation in response to closing the door 22, a time limited water cycle, a time-limited soap cycle (during which the water cycle may be halted or paused). The controller 20 may also control a rinse cycle, a drying cycle, and a cleaning cycle that activates in response to the closing of the door 20 and the exiting of the user.

Important to note is that the controller 20 may include default settings that are adjustable by the user; or it may be fully automated, such that no user input is required. Also, the control device or controller 20 may include at least one of an electronic controller, a user operated pump system, or a series of ports for receiving pressurized air, misted air, misted gas, mist free air, scented air, or mist free gas.

Another embodiment of the present invention includes the secondary wall 26 and the primary wall 24 defining an air channel therebetween. The interior surface 66 of the secondary wall 26 and the outer surface 42 of the primary wall 24 are embodied as including condensing surfaces 68 (first condensing surface and second condensing surface).

Generally, condensing surfaces 68 are cooler in temperature than the mist that is cycled past them, such that the mist condenses on the condensing surfaces 68. Examples of condensing surfaces 68 include stainless steel and various other metals and substances that are generally cooler than the mist from the nozzles 16.

In an alternate embodiment of the present invention, misted air from the nozzles or spouts 16 is ionized or includes an ionized substance. The ionized mist is directed by electrostatic collectors positioned on the user or within the enclosure 12, which attract the ionized mist and direct the ionized mist toward the user or an object in the enclosure 12. The electrostatic collectors may move in response to controller signals to collect liquid in the air and to vary mist intensity in different areas of the enclosure 12.

Water is supplied to the system through a water tank 70, which receives a small amount of water as required for the entire misting cycle. Individual users may bring their own water and input it into the water tank 70, thereby ensuring that the water is fresh and clean. The water is later heated in a heater 72. Alternate embodiments of the present invention include water supplied from the main water storage area of the vehicle including the misting system 10.

Water from the nozzles 16 is generally drained to a water drain 32, whereby condensed water on the condensing surfaces 68 flows downward into the drain position near the bottom of the misting system 10 in response to gravity. Alternate embodiments of the present invention include a removable basin coupled to the enclosure 12.

Referring to FIG. 3, the air flow dynamics of misting system 10, in accordance with another embodiment of the present invention, is illustrated. As was previously discussed, air is blown into the shower area 41 both to dry the user and, during the cleaning cycle, to blow the misted air out of the shower area 41. The misted air is illustrated as blown out of the shower area 41 through openings in the base 36; however alternate embodiments of the present invention include the misted air blown out of openings defined in the walls 34 or ceiling 38, as will be understood by one skilled in the art.

The misted air may be directed out of the system or through the air channel 28 such that water within the misted air condenses on condensing surfaces within the air channel 28. The dried air is then redirected into the shower area 41 until the fan 30 is halted by the user 43 or the controller 20.

Referring to FIGS. 4a and 4b, an alternate embodiment of the misting system is illustrated. The portable mist delivery system 90 is illustrated with a user 92 in FIG. 4b and without the user in 4a. The portable mist delivery system 90 includes the drying system, as was discussed above, but is a portable unit rather than a larger shower unit.

The portable system 90 includes a liquid delivery hose 94 for supplying nozzles 96 within a head unit 98 with pressurized and misted water and shampoo. In other words, a shampoo solution may be misted or sprayed into the system 90. The system 90 further includes a drainage tube 100 receiving condensed mist from the condensing surfaces in a similar manner as discussed regarding FIGS. 1-3. The system 90 may be used for applications including washing and conditioning hair, washing faces, moisturizing skin, nasal congestion, spa treatments, etc.

Figure 5:
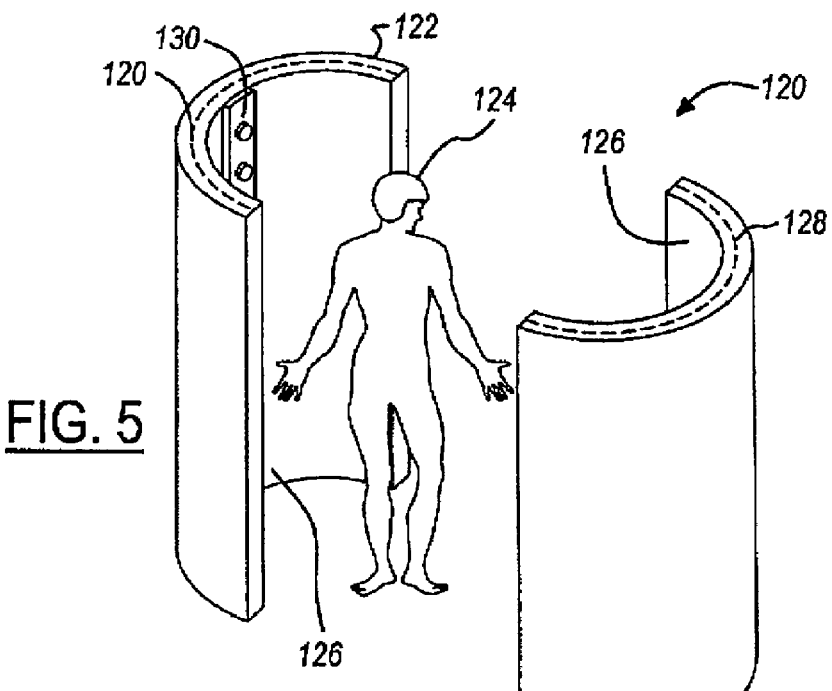
FIG. 5 is a perspective view of a drying system in accordance with another embodiment of the present invention.

Referring to FIG. 5, an alternate embodiment of the present invention including a drying system 120 is illustrated. The drying system 120 includes a stall 122, whereby a user 124 may enter for the purpose of drying, for example, wet clothing. The drying system 120 includes the hydrophobic walls 126 and condensing surfaces 128, as discussed regarding the misting systems referred to above. The system 120 further includes a blower or plurality of blowers 130 for blowing moist or misted air out of the stall 122 and along the condensing surfaces 128 within the stall walls. One application for this dryer system 120 includes an outdoor station for drying off and warming skiers. One skilled in the art will realize numerous other applications for the dryer system 120.

Figure 6:
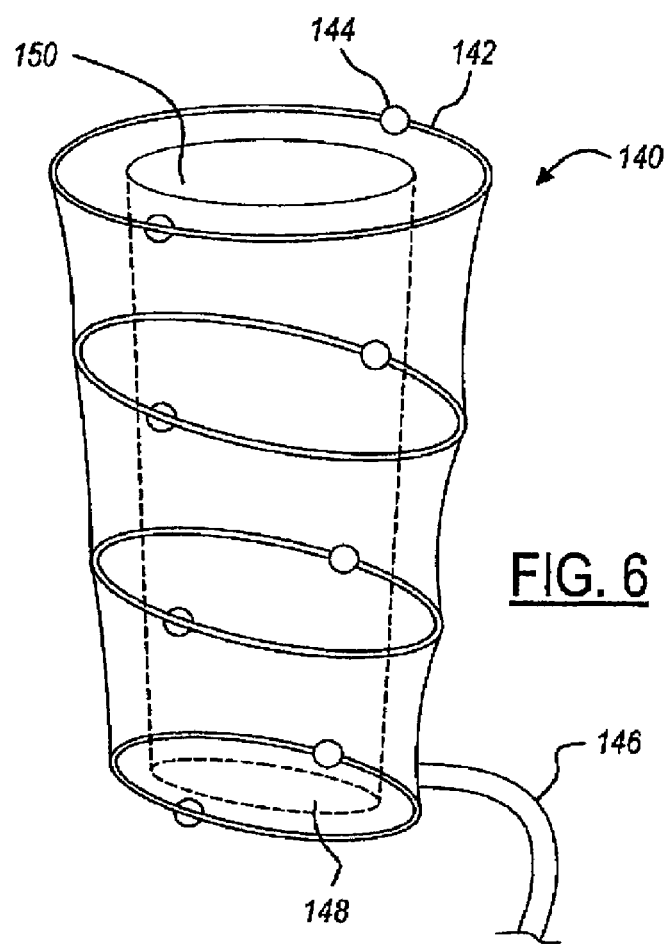
FIG. 6 is a perspective view of a disposable mist delivery system in accordance with another embodiment of the present invention.

Referring to FIG. 6, a disposable embodiment of the shower system is illustrated. The disposable shower system 140 includes a collapsible bag 142 having a plurality of spouts or nozzles 144 therein. The system 140 also includes a control device, here embodied as a pump 146, for pumping misted air into the enclosure 148 formed by the bag 142. The internal surface 150 of the enclosure 148 includes a hydrophobic surface and may be removed for cleaning or disposal. The system 140 is applicable to uses requiring compact shower systems such as camping or military field operations. A larger version of the system may be used in greenhouses (either as the walls of the greenhouse or for localized plant misting) or other known agricultural applications.

In operation, a user generally prepares for the misting shower by removing clothing and inputting water into the water tank 70. At this point, a heater 72 activates and warms the water in preparation for misting from the nozzle 16. The user may then input his height.

The user opens the door 22 and closes it, which may automatically activate misting from the nozzles 16. A misting cycle then begins wherein a specific signal, such as a light glows to indicate how much time remains before the next cycle. The next cycle, a soaping cycle, may include a pause in the misting to conserve water. The misting then reactivates, and a rinse cycle is engaged. A dry cycle is then activated, and the fan 30 blows air through the shower area, and the air is cycled whereby mist within the air is condensed on the condensing surfaces 68 and continually blown within the shower area 41.

Upon completion of the drying cycle, the user exits and closes the door behind them, and an automatic self-cleaning process activates, whereby remaining water in the water pipe or within the nozzles 16 is drained and dried.

Important to note is that if during any of the cycles, the user wishes to exit, an automatic stop cycle may be included such that a timer 74 activates and allows the user a specific amount of time in which to resume the shower. If the user does not resume the shower within the timer-specified allocation, the cleaning process of the shower is activated.

From the foregoing, it can be seen that there has been brought to the art a new shower system 10. It is to be understood that the preceding description of one embodiment of the present invention is merely illustrative of some of the many specific embodiments that represent applications of the principals of the present invention. Numerous and other arrangements would be evident to those skilled in the art without departing from the scope of the invention as defined by the following claims.

We claim:

1. A misting system for misting a user comprising:
    an enclosure defining a receiving area for receiving the user, said enclosure comprises: a primary wall, a secondary wall, and a base, said primary wall comprising an interior surface and an exterior surface, said interior surface of said primary wall defining a drying area, and comprising a hydrophobic surface, said exterior surface extending around the entire periphery of said interior surface, said exterior surface comprising a first condensing surface, said base further including a drain opening receiving misted air during a drying cycle in said base and including a plurality of openings in said base, said secondary wall comprising an inner surface, said inner surface of said secondary wall comprising a second condensing surface, wherein an air channel is defined between said exterior surface of said primary wall and said inner surface of said secondary wall the water contained within mist flowing through said air channel condenses on said first condensing surface and said second condensing surface;

a collector positioned at a base of said air channel whereby condensed water may descend into said collector for removal, wherein the second condensing surface extends around the entire periphery of the primary wall, a plurality of mist dispensers positioned within said enclosure and capable of delivering a uniform coating of a misted substance to the user, wherein said misted substance comprises at least one of water, an ionized liquid, insect repellant, medical equipment sterilizer, soap skin, moisturizer, nasal decongestant, artificial suntan lotion, or spa treatments;

a hand held nozzle for spraying the user in areas not sufficiently covered by said mist dispensers; and a control device directing said misted substance through said plurality of mist dispensers, said control device further activating an air flow system such that misted air within said enclosure exits said enclosure through said drain opening during said drying cycle and flows along and condenses on said condensing surfaces.

2. The system of claim 1, wherein said misted substance is ionized.

3. The system of claim 1 further comprising a mount coupled to said enclosure such that said enclosure is capable of being coupled to country houses, cabins, rest areas, camping facilities, beaches, and military installations, RVs, maritime vessels, hospital beds, trucks, airplanes, space vehicles, trains, buses, and mobile medical units.

4. An airplane containing a misting system according to claim 1.

5. A misting system for misting a user comprising:

an enclosure defining a receiving area for receiving the user, said enclosure further comprising a primary wall, a secondary wall, and a base, said primary wall comprising an interior surface and an exterior surface, said interior surface of said primary wall defining a drying area, and comprising a hydrophobic surface, said exterior surface extending around the entire periphery of said interior surface, said exterior surface comprising a first condensing surface, said base further including a drain opening receiving misted air during a drying cycle in said base and including a plurality of openings in said base, said secondary wall comprising an inner surface, said inner surface of said secondary wall comprising a second condensing surface, wherein an air channel is defined between said exterior surface of said primary wall and said inner surface of said secondary wall the water contained within mist flowing through said air channel condenses on said first condensing surface and said second condensing surface;

a plurality of mist dispensers positioned within said enclosure and capable of delivering a uniform coating of a misted substance to the user; and a control device directing said misted substance through said plurality of mist dispensers, said control device further activating an air flow system such that misted air within said enclosure exits said enclosure through said openings in said base and said drain opening during said drying cycle and flows along and condenses on said condensing surface.

6. The system of claim 5, wherein said enclosure comprises a cylindrical, cubicle, conical, or irregular shape.

7. The system of claim 5 further comprising a user accessible misted substance input tank receiving a substance to be misted from the user.

8. The system of claim 5 further comprising an input display, whereby commands are entered for physical dimensions of the user such that the system conserves the misted substance by either said plurality of mist dispensers aimed at the user or only operating a portion of said plurality of mist dispensers corresponding with said physical dimensions of the user.

9. The system of claim 5 further comprising at least one height sensor generating a height of user signal.

10. The system of claim 5, wherein said control device receives at least one of: a height of user signal, a temperature within said enclosure signal, or a distance signal and adjusts said plurality of mist dispensers as a function thereof.

11. The system of claim 5 further comprising at least one distance sensor generating a distance signal as a function of a distance between said plurality of mist dispensers and the user.

12. The system of claim 5, wherein said misted substance is ionized.

13. The system of claim 5 further comprising a mount coupled to said enclosure such that said enclosure is capable of being coupled to country houses, cabins, rest areas, camping facilities, beaches, and military installations, RVs, maritime vessels, hospital beds, trucks, airplanes, space vehicles, trains, buses, and mobile medical units.

14. The system of claim 5, wherein said control device is powered through at least one of $CO_2$ cartridges, wind, solar panels, human movements, gravity pressure, fuel cells, reactors, propane, pressurized water, solid fuel, or gas.

15. The system of claim 5 farther comprising user adjustable nozzles.

16. The system of claim 5 further comprising a hand held nozzle for spraying the user in areas not significantly covered by said mist dispensers.

* * * * *

UNITED STATES PATENT AND TRADEMARK OFFICE
CERTIFICATE OF CORRECTION

PATENT NO. : 7,454,803 B2  Page 1 of 1
APPLICATION NO. : 11/944880
DATED : November 25, 2008
INVENTOR(S) : Jeanne Guerin et al.

It is certified that error appears in the above-identified patent and that said Letters Patent is hereby corrected as shown below:

Title page, item [75]
Please correct the spelling of the inventor: Kevin S. Zielke's name as follows:
 Change "Zielki" to --Zielke--

Signed and Sealed this

Sixth Day of January, 2009

JON W. DUDAS
*Director of the United States Patent and Trademark Office*